United States Patent
Stead

(10) Patent No.: US 6,690,401 B1
(45) Date of Patent: Feb. 10, 2004

(54) METHOD AND APPARATUS FOR CELL SCROLLING A DATA STRUCTURE

(75) Inventor: Larry Stead, Upper Montclair, NJ (US)

(73) Assignee: AT&T Corp., New York, NY (US)

( * ) Notice: Subject to any disclaimer, the term of this patent is extended or adjusted under 35 U.S.C. 154(b) by 479 days.

(21) Appl. No.: 09/619,616

(22) Filed: Jul. 19, 2000

Related U.S. Application Data

(60) Provisional application No. 60/145,015, filed on Jul. 22, 1999.

(51) Int. Cl.[7] ................................................. G06F 3/14
(52) U.S. Cl. ........................ 345/784; 345/786; 345/804; 713/503
(58) Field of Search ................................ 345/784, 786, 345/804, 805, 781, 785, 833, 780; 715/503, 509, 526, 530

(56) References Cited

U.S. PATENT DOCUMENTS

| | | | | |
|---|---|---|---|---|
| 4,506,343 A | * | 3/1985 | Shipp, Jr. et al. ............ | 715/509 |
| 5,943,051 A | * | 8/1999 | Onda et al. .................. | 345/786 |
| 6,012,073 A | * | 1/2000 | Arend et al. ................. | 715/526 |
| 6,078,306 A | * | 6/2000 | Lewis ..................... | 345/784 X |
| 6,380,947 B1 | * | 4/2002 | Stead ..................... | 345/784 X |
| 6,430,574 B1 | * | 8/2002 | Stead ..................... | 345/784 X |

* cited by examiner

*Primary Examiner*—Raymond J. Bayerl

(57) ABSTRACT

Apparatus and methods to scroll a plurality of data. A first portion of a first data can be displayed within a first display area, and a first portion of a second data can be displayed within a second display area. A cell scrolling instruction may be received, and a cell scrolling display value may be determined based at least in part on the received cell scrolling instruction. A second portion of the first data can be selected based at least in part on the cell scrolling display value, and a second portion of the second data can be selected based at least in part on the cell scrolling display value. The second portion of the first data can be displayed within the first display area, and the second portion of the second data can be displayed within the second display area.

18 Claims, 8 Drawing Sheets

KNOWN ART

FIG. 2

KNOWN ART

|  | C | D | E |
|---|---|---|---|
| 12 | ABCDEFGHIJ | 123456789ABC | NOVEMBER 30, |
| 13 | | | |
| 14 | | | |
| 15 | | | |
| 16 | | | |
| 17 | AGB@researc | WATSON, I NEED | FEBRUARY 27,1 |
| 18 | | | |
| 19 | | | |
| 20 | | | |
| 21 | | | |
| 22 | | | |
| 23 | ALEXANDER G. B | FLORHAM PARK, | MAY 20, 1999 |

FIG. 3

KNOWN ART

|  | D | E | F |
|---|---|---|---|
| 12 | 123456789ABC | NOVEMBER 30, | |
| 13 | | | |
| 14 | | | |
| 15 | | | |
| 16 | | | |
| 17 | WATSON, I NEED | FEBRUARY 27,1 | |
| 18 | | | |
| 19 | | | |
| 20 | | | |
| 21 | | | |
| 22 | | | |
| 23 | FLORHAM PARK, | MAY 20, 1999 | |

*FIG. 4*

| | C | D | E |
|---|---|---|---|
| 12 | ABCDEFGHIJ | 123456789ABC | NOVEMBER 30, |
| 13 | | | |
| 14 | | | |
| 15 | | | |
| 16 | | | |
| 17 | AGB@researc | WATSON, I NEED | FEBRUARY 27,1 |
| 18 | | | |
| 19 | | | |
| 20 | | | |
| 21 | | | |
| 22 | | | |
| 23 | ALEXANDER G. B | FLORHAM PARK, | MAY 20, 1999 |

FIG. 5

|     | C | D | E |
|-----|---|---|---|
| 12  | DEFGHIJKLM | 456789ABCDE | VEMBER 30, 19 |
| 13  | | | |
| 14  | | | |
| 15  | | | |
| 16  | | | |
| 17  | @research.att. | TSON, I NEED YO | BRUARY 27,199 |
| 18  | | | |
| 19  | | | |
| 20  | | | |
| 21  | | | |
| 22  | | | |
| 23  | XANDER G. BELL | ORHAM PARK, NJ | MAY 20, 1999 |

*FIG. 6*

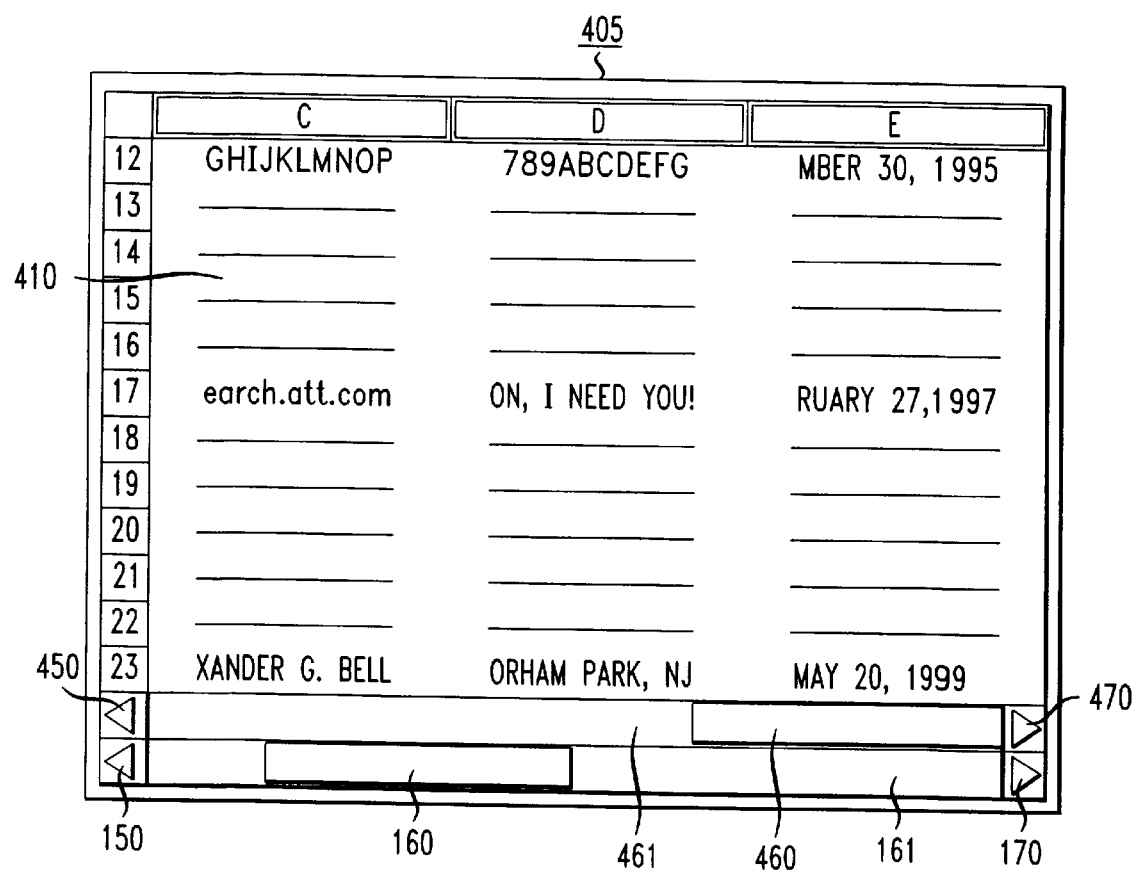

|     | C | D | E |
|-----|---|---|---|
| 12  | GHIJKLMNOP | 789ABCDEFG | MBER 30, 1995 |
| 13  | | | |
| 14  | | | |
| 15  | | | |
| 16  | | | |
| 17  | earch.att.com | ON, I NEED YOU! | RUARY 27, 1997 |
| 18  | | | |
| 19  | | | |
| 20  | | | |
| 21  | | | |
| 22  | | | |
| 23  | XANDER G. BELL | ORHAM PARK, NJ | MAY 20, 1999 |

*FIG. 7*

|     | C            | D            | E             |
|-----|--------------|--------------|---------------|
| 12  | GHIJKLMNOP   | 789ABCDEFG   | MBER 30, 1995 |
| 13  |              |              |               |
| 14  |              |              |               |
| 15  |              |              |               |
| 16  |              |              |               |
| 17  | earch.att.com| ON, I NEED YOU! | RUARY 27, 1997 |
| 18  |              |              |               |
| 19  |              |              |               |
| 20  |              |              |               |
| 21  |              |              |               |
| 22  |              |              |               |
| 23  | XANDER G. BELL | ORHAM PARK, NJ | MAY 20, 1999 |

FIG. 8

|     | C | D | E |
|-----|---|---|---|
| 12  | GHIJKLMNOP | 789ABCDEFG | MBER 30, 1995 |
| 13  |   |   |   |
| 14  |   |   |   |
| 15  |   |   |   |
| 16  |   |   |   |
| 17  | earch.att.com | ON, I NEED YOU! | RUARY 27,1997 |
| 18  |   |   |   |
| 19  |   |   |   |
| 20  |   |   |   |
| 21  |   |   |   |
| 22  |   |   |   |
| 23  | XANDER G. BELL | ORHAM PARK, NJ | MAY 20, 1999 |

FIG. 9

|     | C | D | E |
|-----|---|---|---|
| 12  | GHIJKLMNOP | 789ABCDEFG | MBER 30, 1995 |
| 13  |   |   |   |
| 14  |   |   |   |
| 15  |   |   |   |
| 16  |   |   |   |
| 17  | earch.att.com | ON, I NEED YOU! | RUARY 27,1997 |
| 18  |   |   |   |
| 19  |   |   |   |
| 20  |   |   |   |
| 21  |   |   |   |
| 22  |   |   |   |
| 23  | XANDER G. BELL | ORHAM PARK, NJ | MAY 20, 1999 |

METHOD AND APPARATUS FOR CELL SCROLLING A DATA STRUCTURE

CROSS REFERENCE TO RELATED APPLICATION

The present application claims the benefit of U.S. provisional patent application Serial No. 60/145,015 entitled "DISPLAYING AND SCROLLING A HIERARCHICAL DATA STRUCTURE" filed on Jul. 22, 1999.

FIELD OF THE INVENTION

Embodiments of the present invention relate to text and graphical data user interfaces. More particularly, embodiments of the present invention relate to displaying and scrolling a data structure.

BACKGROUND OF THE INVENTION

Modern computers and data processing devices typically utilize displays such as CRT's (Cathode Ray Tubes) and LCD's (Liquid Crystal Displays) to display text and graphics data. A user interacts with an application program that allows the creation, viewing and/or editing of a data file or document on the display device. Data files or documents often contain a large amount of text and graphics data that cannot be displayed simultaneously on a display.

Computing devices typically can execute a technique known as scrolling to permit a user to navigate through a document. Scrolling is an operation in which a user issues commands to a computing device to instruct it to display a particular portion of data on a display. The user scrolls a document by issuing commands through a keyboard or mouse. Known scrolling controls include a scroll bar, consisting of an icon displayed on the display, that allows the user to instruct the computer (via a pointing device such as a mouse) to display a different portion of the document. Conventional scrolling controls provide a range of functionality, typically allowing the user to scroll data up, down, left or right.

FIG. 1 illustrates a display of data in a known scrolling user interface. Typically the user interface depicted in FIG. 1 may be implemented in a Windows® graphical user interface environment but can also be applicable to a non-Windows® environment. In one embodiment, the known user interface is a graphical user interface (GUI). The user interface depicted in FIG. 1 includes an arrangement of control icons for performing scrolling operations. Window 105 includes a plurality of display areas 110, a left scrolling button 150, a right scrolling button 170, and a horizontal scrolling bar 160 within a horizontal scrolling field 161. When a user selects either left scrolling button 150 or right scrolling button 170 by clicking on the respective scrolling button using a mouse, contents of window 105 can scroll in the respective direction. Window 105, as shown in FIG. 1, includes data displayed in cells (e.g., display areas) corresponding to rows 12 through 23 and columns C through E. The position of the horizontal scroll bar 160 (e.g., neither at the leftmost position within horizontal scrolling field 161 nor at the rightmost position within horizontal scrolling field 161, etc.) shows that additional data can be displayed to the left (e.g., a column B, a column A, not shown in FIG. 1) and to the right (e.g., a column F, a column G, not shown in FIG. 1). The user may also scroll window 105 by clicking and dragging horizontal scrolling bar 160 within horizontal scrolling field 161 in the desired direction of scrolling.

The known user interface illustrated in FIG. 1 can display hierarchical data, non-hierarchical data, etc. An example of hierarchical data includes music data (e.g., artist, album and song data), and an example of non-hierarchical data includes e-mail data (e.g., e-mail sender, e-mail subject, e-mail date, e-mail time, etc.). FIG. 1 shows that each of the data of the displayed cells of columns C and D are displayed in the entirety (e.g., each of data "ABCDEFGHIJKLMNOP", "123456789ABCDEFG", "AGB@research.att.com", "Watson, I need you!", "Alexander G. Bell", "Florham Park, N.J." is fully displayed). The data of the displayed cells of column E are not displayed in their entirety. Due to display constraints (e.g., a displayed size of window 105, a size of a display device on which window 105 is displayed, a width of a displayed column, etc.), less than the entirety of the data of the displayed cells of column E are displayed (e.g., only "No" of "Nov. 30, 1995" is displayed, only "Fe" of "Feb. 27, 1997" is displayed, only "Ma" of "May 20, 1999" is displayed).

FIG. 2 shows another illustration of the known scrolling user interface and data displayed in FIG. 1. In FIG. 2, the column widths of columns C, D, and E have been resized such that certain of the data of the displayed cells are not displayed in their entirety (e.g., only "Watson, I need" of "Watson, I need you!" is displayed, etc.). As compared to FIG. 1, a smaller proportion of each data of the displayed cells of columns C and D is displayed, while a greater proportion of each data of the displayed cells of column E is displayed. FIG. 3 illustrates a display of data in the known scrolling user interface after a one column scrolling operation with respect to the display of data in FIG. 2. After a user has instructed the known scrolling user interface to implement a one column scrolling operation (e.g., by clicking on the right scrolling button 170, by moving horizontal scrolling button 160 to the right within horizontal scrolling field 161, etc.), the data of column C are no longer displayed and the data of column F can be displayed. In view of the foregoing, it can be appreciated that a substantial need exists for methods and apparatus which can advantageously scroll displayed data.

SUMMARY OF THE INVENTION

Embodiments of the present invention encompass apparatus and methods to scroll a plurality of data. A first portion of a first data can be displayed within a first display area, and a first portion of a second data can be displayed within a second display area. A cell scrolling instruction may be received, and a cell scrolling display value may be determined based at least in part on the received cell scrolling instruction. A second portion of the first data can be selected based at least in part on the cell scrolling display value, and a second portion of the second data can be selected based at least in part on the cell scrolling display value. The second portion of the first data can be displayed within the first display area, and the second portion of the second data can be displayed within the second display area.

BRIEF DESCRIPTION OF THE DRAWINGS

FIG. 2 shows another illustration of the known scrolling user interface and data displayed in FIG. 1.

FIG. 3 illustrates a display of data in the known scrolling user interface after a one column scrolling operation with respect to the display of data in FIG. 2.

FIG. 4 illustrates a user interface with enhanced scrolling features to display and cell scroll data of a data structure in accordance with an embodiment of the present invention.

FIG. 5 illustrates the user interface of FIG. 4 after a cell scrolling operation has been performed.

FIG. 6 illustrates the user interface of FIG. 5 after a cell scrolling operation has been performed.

FIG. 7 illustrates an embodiment of the present invention including a toggle icon to toggle a set of scrolling icons between conventional scrolling and cell scrolling.

FIG. 8 shows another user interface in accordance with an embodiment of the present invention.

FIG. 9 shows another user interface in accordance with an embodiment of the present invention.

DETAILED DESCRIPTION

Figure 1:
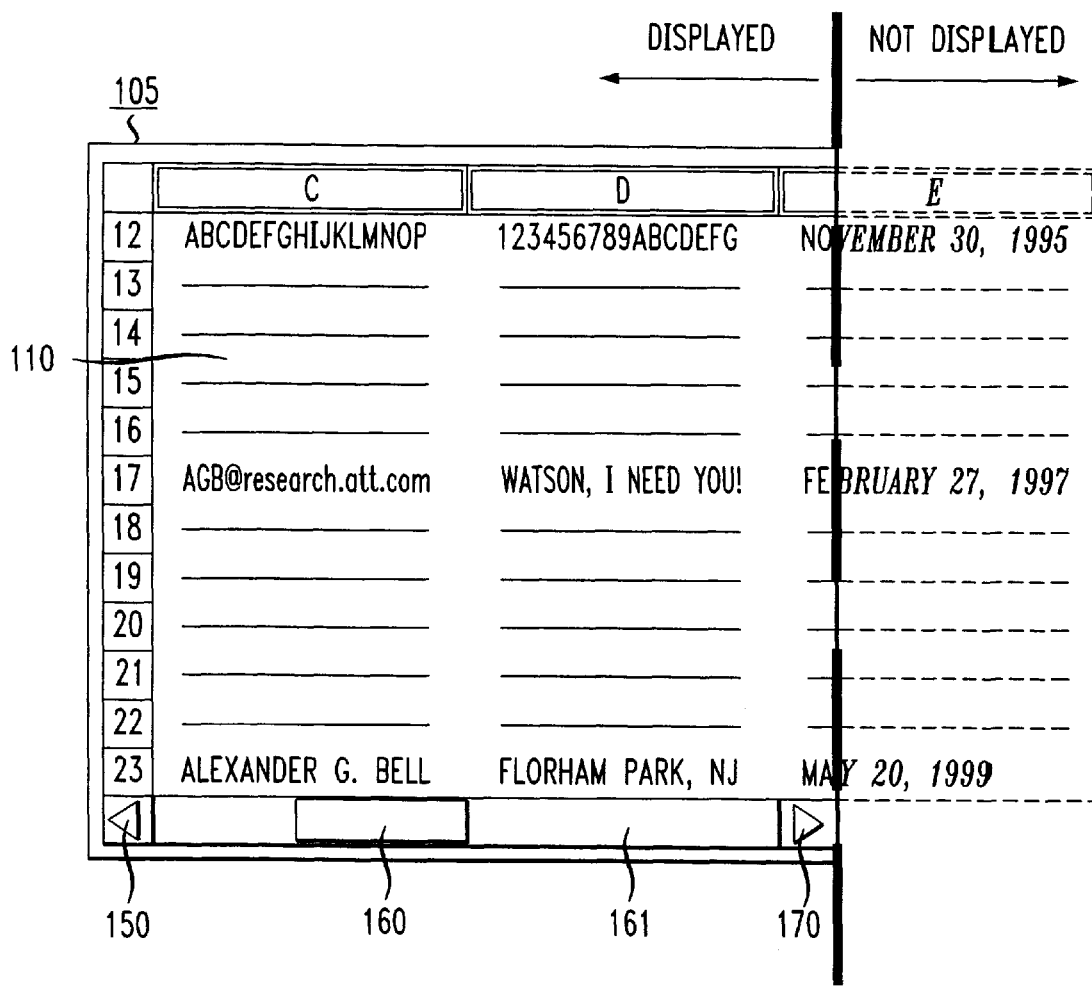
FIG. 1 illustrates a display of data in a conventional scrolling user interface.

According to an embodiment of the present invention a plurality of data of a data structure are displayed. A first portion of a first data of the plurality of data is displayed, and a second portion of a second data of the plurality of data is displayed. A cell scrolling instruction is received, and a cell scrolling display value is determined based at least in part on the received cell scrolling instruction. A second portion of the first data is selected based at least in part on the cell scrolling instruction, and a second portion of the second data is selected based at least in part on the cell scrolling instruction. The second portion of the first data and the second portion of the second data are displayed.

FIG. 4 illustrates a user interface with enhanced scrolling features to display and cell scroll data of a data structure in accordance with an embodiment of the present invention. The user interface illustrated in FIG. 4 can be implemented in a text-based environment and/or a graphical environment. According to an embodiment of the present invention, the scrolling system includes graphical icons that allow control of various scrolling functions. A user can interact with the graphical icons using a pointing device (e.g., a mouse, etc.) by directing a cursor or selection icon over an area of a graphic icon displayed on a display device and pressing the a button on the pointing device. The user interface of FIG. 4 can be displayed on a display device such as a CRT, a video monitor, a LCD screen, a display screen of hand-held device, etc. The user interface shown in FIG. 4 corresponds to the conventional user interface shown in FIG. 2, but window 405 includes a plurality of display areas 410, a left cell scrolling button 450, a cell scrolling bar 460 within cell scrolling field 461, and a right cell scrolling button 470. The position of the cell scrolling bar 460 is at its leftmost position within cell scrolling field 461, and the leftmost displayable portion of each data within the displayed cells is displayed. For example, the "Watson, I need" portion (i.e., a leftmost portion) of "Watson, I need you!" is displayed within the cell corresponding to column D, row 17. Further, the entire portion of "May 20, 1999" is displayed within the cell corresponding to column E, row 23. While columns C, D, and E are illustrated as having a similar width, embodiments of the present invention encompasses displays of data in columns of equal width, varying width, constant width, variable width, etc.

FIG. 5 illustrates the user interface of FIG. 4 after a cell scrolling operation has been performed. As compared to FIG. 4, the cell scrolling bar 460 has been moved rightward (e.g., after a user clicked and dragged the cell scrolling bar 460 to the right, after a user clicked the right cell scroll button 470 a number of times, etc.). In response to the movement of the cell scrolling bar 460, the portion of data displayed within each displayed cell has been correspondingly scrolled. The position of the cell scrolling bar 460 is at an approximately center position, within cell scrolling field 461, and a central displayable portion of each data within the displayed cells is displayed. For example, the "tson, I need yo" portion (i.e., a central portion) of "Watson, I need you!" is displayed within the cell corresponding to column D, row 17. Whereas a conventional horizontal scrolling bar (e.g., horizontal scrolling bar 160) typically scrolls columns across a display window (e.g., as illustrated by FIG. 2 and FIG. 3), embodiments of the present invention provide for the scrolling of data displayed within a plurality of display areas, within displayed cells of an aggregate display area, etc.

Embodiments of the present invention advantageously allow a greater number of columns of data to be displayed within a window, display area, display, etc. Such columns of data can correspond to data columns in a spreadsheet, fields of a listing of data records, fields of e-mail data (e.g., a sender field, subject field, data field, etc.), etc. Embodiments of the present invention can allow a greater number of columns of data to be displayed simultaneously, and varying portions of the data can be displayed by cell scrolling the data. Displaying columns at a width that allows the entirety of the data to be displayed can disadvantageously restrict the number of columns of data that can be displayed simultaneously. Embodiments of the present invention can advantageously allow a greater flexibility in the display of data, including hierarchical information.

In an embodiment of the present invention, a computer can display window 405 and receive a cell scrolling instruction, e.g., a user can move cell scrolling bar 460 right or left within cell scrolling field 461, the user can click on left cell scrolling button 450, right cell scrolling button 470, etc. Based at least in part on the cell scrolling instruction, the computer can determine a cell scrolling display value and select the appropriate portions of data to be displayed based on the cell scrolling display value.

In an embodiment, the cell scrolling display value is a cell scrolling display percentile and can be based on the position of the cell scrolling bar 460 within the cell scrolling field 461. The cell scrolling display percentile can have a value of 0 to 100 based on the position of the cell scrolling bar 460 within the cell scrolling field 461, e.g., have a value of zero when the cell scrolling bar 460 is at the leftmost position within cell scrolling field 461, have a value of 100 when the cell scrolling bar is at the rightmost of cell scrolling field 461, have a value of 33 when the cell scrolling bar is one third of the way from the left edge of cell scrolling field 461, have a value of 50 when the cell scrolling bar is at or near the center of the cell scrolling field 461, have a value of 75 when the vertical scrolling bar is three-quarters of the way from the left edge of cell scrolling field 461, etc. In another embodiment, a user can enter a cell scrolling instruction by entering a number (e.g., a number zero to one hundred), by manipulating graphical control icons (e.g., a dial-like icon), etc.

In an embodiment of the present invention, after the computer receives a cell scrolling instruction, it can determine whether the data to be displayed within a cell can be displayed in its entirety. When the data to be displayed within a cell can be displayed in its entirety, the data may be displayed in its entirety (e.g., "May 20, 1999" being displayed within the cell corresponding to column E, row 23). When the data to be displayed within a cell cannot be displayed in its entirety, the computer can determine the portion of the data to be displayed based on a cell scrolling display value. For example, in an embodiment of the present invention the portion of the data to be displayed can be based at least in part on the cell scrolling display value.

In an embodiment, the cell scrolling display value is a cell scrolling display percentile. When the cell scrolling display percentile is 0, the portion of the data to be displayed includes the leftmost portion of the data. When the cell scrolling display percentile is 50, the central portion of the data is displayed. When the cell scrolling display percentile is 100, the portion of the data to be displayed includes the rightmost portion of the data. As the cell scrolling display percentile varies from 0 to 50 to 100, the portion of the data to be displayed can vary from including the leftmost portion, to including the central portion, to including the rightmost portion. The portion of the data to be displayed also can be based on the overall data characteristics (e.g., the data includes 20 characters, the data includes 40 characters, the data requires 1 inch of display to be displayed in entirety, etc.), display characteristics (e.g., a displayed size of window 105, a size of a display device on which window 105 is displayed, a width of a displayed column, etc.), etc.

FIG. 6 illustrates the user interface of FIG. 5 after a cell scrolling operation has been performed. As compared to FIG. 5, the cell scrolling bar 460 has been moved to the rightmost position within the cell scrolling field 461, and the portions of data displayed in the cells include at least the rightmost portion of each data. For example, the rightmost portion "on, I need you!" of "Watson, I need you!" is displayed in the cell corresponding to column D, row 17.

FIG. 7 illustrates an embodiment of the present invention including a toggle icon to toggle a set of scrolling icons between conventional scrolling and cell scrolling. Cell scrolling toggle icon 780 can be selected and deselected to change the scrolling icons from controlling conventional scrolling icons to cell scrolling icons. For example, as illustrated in FIG. 7, cell scrolling toggle icon 780 has been selected, and the displayed scrolling icons—left scrolling button 750, scrolling bar 760 within scrolling field 761, and right scrolling button 770—can perform cell scrolling in accordance with embodiments of the present invention. When cell scrolling toggle icon 780 is not selected, the displayed scrolling icons—left scrolling button 750, scrolling bar 760 within scrolling field 761, and right scrolling button 770—can perform conventional scrolling (e.g., column scrolling as illustrated in FIGS. 2–3, etc.).

FIG. 8 shows another user interface in accordance with an embodiment of the present invention. Cell scrolling bar 860 displayed within cell scrolling field 861 can perform cell scrolling in accordance with an embodiment of the present invention. FIG. 9 shows another user interface in accordance with an embodiment of the present invention. The user interface illustrated in FIG. 9 shows the cell scrolling control icons 450–470 positioned beside the conventional scrolling icons 150–170. While embodiments of the present invention have been described with respect to horizontal cell scrolling, embodiments of the present invention encompass other types of cell scrolling such as vertical cell scrolling (e.g., where data displayed in cells can be vertically scrolled to display differing vertical portions of data, etc.), three dimensional cell scrolling (e.g., where data displayed in cells in three dimensions can scrolled along various axis such as an x-axis, a y-axis, and a z-axis to display differing portions of data, etc.), etc.

Figure 10:
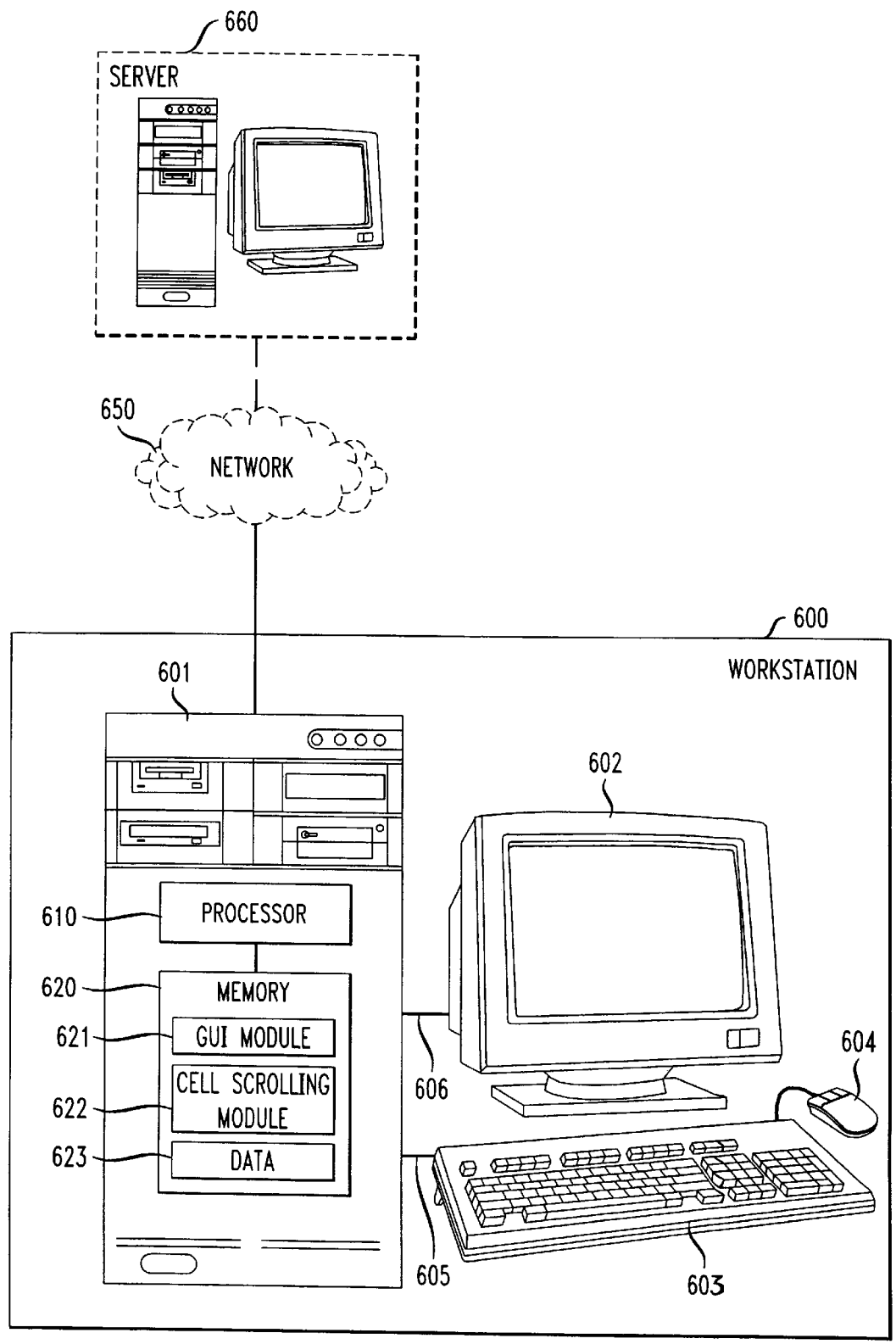
FIG. 10 shows an illustration of a system in accordance with an embodiment of the present invention.

FIG. 10 shows an illustration of a system in accordance with an embodiment of the present invention. A workstation 600 includes computer 601, which can coupled to a video display 602 via an external graphics bus 606. The external graphics bus 606 can be an Advanced Graphics Port (AGP) compliant bus. The term "coupled" encompasses a direct connection, an indirect connection, etc. Computer 601 in one embodiment includes a processor 610, such as the Pentium® III processor manufactured by Intel Corp. of Santa Clara, Calif. In another embodiment, the processor 610 can be an Application Specific Integrated Circuit (ASIC). Computer 601 can includes a memory 620 coupled to the processor. Memory 620 encompasses devices adapted to store digital information, such as Dynamic Random Access Memory (DRAM), Rambus® DRAM (RDRAM), flash memory, a hard disk, an optical digital storage device, a combination thereof, etc. The computer 601 can be coupled to a keyboard 603 and a mouse 604 via an external computer bus 605. In one embodiment, the external computer bus 605 is a Universal Serial Bus (USB) compliant bus.

Memory 620 can include instructions adapted to be executed by the processor 610 to perform a method in accordance with an embodiment of the present invention. The term "instructions adapted to be executed" is meant to encompass any instructions that are ready to be executed in their present form (e.g., machine code) by a processor, or require further manipulation (e.g., compilation, decryption, decoding, or provided with an access code, etc.) to be ready to be executed by a processor (e.g., processor 610). In one embodiment, the memory 620 can include a GUI module 621 to implement a GUI (i.e., graphical user interface). In conjunction with the GUI module 621, a cell scrolling module 622 can implement an embodiment of the present invention with respect to data 623.

In another embodiment of the present invention, the workstation 600 is coupled to a server 660 via a network 650. Examples of network 650 include the internet, a WAN (wide area network), LAN (local area network), an intranet, a communications network, a computer network, a combination thereof, etc. In one embodiment, the server 660 is coupled to a storage device that typically stores data on a magnetic medium such as a magnetic disk. For example, the storage device may store application programs and associated data files/documents. The documents may include, for example, word processing documents, spreadsheet documents, HTML (Hypertext Markup Language) documents, etc. Workstation 600 may access data stored in the storage device via server 660 and network 650. In an embodiment, server 660 can display information (e.g., data, a GUI component, a web page, etc.) on display 602 by sending information signals to workstation 600 via network 650.

Cell scrolling module 622 and GUI module 621 can be subcomponents of an operating system running on workstation 600. In another embodiment, cell scrolling module 622 and GUI module 621 can be supplementary routines of a particular application program running on workstation 600. In a further embodiment, cell scrolling module 622 and GUI module 621 are implemented as JAVA applets and stored on server 660. In such an embodiment, cell scrolling module 622 and GUI module 621 are downloaded as appropriate or as integrated components of a particular JAVA applet via network 650 to workstation 600 and are executed via a JAVA virtual machine implemented on workstation 600. An advantage of a JAVA implementation is that cell scrolling module 622 and GUI module 621 can be written and function independently of platform specific workstation 600.

In another embodiment, cell scrolling module 622 and GUI module 621 are accessed through an application programmer's interface (API) that provides a convenient encapsulation structure for invoking the cell scrolling module 622 and the GUI module 621. For example, according to an embodiment of the present invention, cell scrolling module 622 and GUI module 621 are implemented using a class structure in C++ or JAVA.

Data 623 can encompass hierarchical data, non-hierarchical data, etc. Data 623 can be a document corresponding to a particular application such as a word processing document, a spreadsheet document, an HTML document, etc.

In accordance with an embodiment of the present invention, instructions adapted to be executed by a processor to perform a method in accordance with an embodiment of the present invention are stored on a computer-readable medium and distributed as software. The computer-readable medium can be a device that stores digital information. For example, a computer-readable medium includes a portable magnetic disk, such as a floppy disk; or a Zip® disk, manufactured by the Iomega Corporation of Roy, Utah (Zip® is a registered trademark of Iomega Corporation); or a Compact Disk Read Only Memory (CD-ROM) as is known in the art for distributing software. The computer-readable medium can be distributed to a user that has a processor suitable for executing instructions adapted to be executed.

Embodiments of the present invention advantageously allow the display and cell scrolling of data. Embodiments of the present invention can advantageously result in increased efficiency and information content being conveyed to a user.

Embodiments of methods and apparatus to scroll a plurality of data have been described. In the foregoing description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

In the foregoing detailed description, apparatus and methods in accordance with embodiments of the present invention have been described with reference to specific exemplary embodiments. Accordingly, the present specification and figures are to be regarded as illustrative rather than restrictive.

What is claimed is:

1. A method of scrolling a plurality of data in a record comprising one of a row and a column, the method comprising:

receiving a record scrolling instruction for scrolling the record in a first direction;

selecting a portion of the plurality of data for display based at least in part on the record scrolling instruction, the portion of the plurality of data including at least a first portion of a first data and a first portion of a second data;

sending an information signal to display the first portion of the first data within a first display area;

sending an information signal to display the first portion of the second data within a second display area;

receiving a cell scrolling instruction for scrolling cells in the first direction;

determining a cell scrolling display value based at least in part on the cell scrolling instruction;

selecting a second portion of the first data based at least in part on the cell scrolling display value;

selecting a second portion of the second data based at least in part on the cell scrolling display value;

sending an information signal to display the second portion of the first data within the first display area; and sending an information signal to display the second portion of the second data within the second display area.

2. The method of claim 1 wherein the cell scrolling display value is a cell scrolling display percentile.

3. The method of claim 1 wherein the first display area and the second display area are display areas of a graphical user interface.

4. The method of claim 1 wherein the first display area and the second display area are display areas of a text-based user interface.

5. The method of claim 1 wherein the first data and the second data are data of a plurality of data displayed in columns and rows.

6. An apparatus to scroll a plurality of data in a record comprising one of a row and a column, the apparatus comprising:

a processor; and a memory, coupled to said processor, storing a plurality of instructions adapted to be executed by said processor to:

receive a record scrolling instruction for scrolling the record in a first direction;

select a portion of the plurality of data for display based at least in part on the record scrolling instruction, the portion of the plurality of data including at least a first portion of a first data and a first portion of a second data;

display a first portion of the first data within the first display area, display a first portion of the second data within the second display area, receive a cell scrolling instruction for scrolling cells in the first direction, determine a cell scrolling display value based at least in part on the cell scrolling instruction, select a second portion of the first data based at least in part on the cell scrolling display value, select a second portion of the second data based at least in part on the cell scrolling display value, display the second portion of the first data within the first display area, and display the second portion of the second data within the second display area.

7. The apparatus of claim 6 wherein the cell scrolling display value is a cell scrolling display percentile.

8. The apparatus of claim 6 wherein the first display area and the second display area are display areas of a graphical user interface.

9. The apparatus of claim 6 wherein the first display area and the second display area are display areas of a text-based user interface.

10. The apparatus of claim 6 wherein the first data and the second data are data of a plurality of data displayed in columns and rows.

11. A computer-readable medium storing a plurality of instructions adapted to be executed by a processor to scroll a plurality of data in a record comprising one of a row and a column, the plurality of instructions comprising instructions to:

receive a record scrolling instruction for scrolling the record in a first direction;

select a portion of the plurality of data for display based at least in part on the record scrolling instruction, the portion of the plurality of data including at least a first portion of a first data and a first portion of a second data;

display the first portion of the first data within a first display area, display the first portion of the second data within a second display area, receive a cell scrolling instruction for scrolling cells in the first direction, determine a cell scrolling display value based at least in part on the cell scrolling instruction, select a second portion of the first data based at least in part on the cell scrolling display value, select a second portion of the second data based at least in part on the cell scrolling display value, display the second portion of the first data within the first display area, and display the second portion of the second data within the second display area.

12. The medium of claim 11 wherein the cell scrolling display value is a cell scrolling display percentile.

13. The medium of claim 11 wherein the first display area and the second display area are display areas of a graphical user interface.

14. The medium of claim 11 wherein the first display area and the second display area are display areas of a text-based user interface.

15. The medium of claim 11 wherein the first data and the second data are data of a plurality of data displayed in columns and rows.

16. The medium of claim 11 wherein the displayed first portion and second portion of the first data and the displayed first portion and second portion of the second data include displayed text-based characters.

17. The medium of claim 11 wherein the displayed first portion and second portion of the first data and the displayed first portion and second portion of the second data include displayed graphical information.

18. A method of scrolling a plurality of data in a row, the method comprising:

displaying a row scrolling control for scrolling the row and having a first scrolling bar moveable in a direction parallel to the row;

displaying a cell scrolling control for scrolling cells in a direction parallel to the row and having a second scrolling bar moveable in a direction parallel to the row;

sending an information signal to display a first portion of a first data within a first display area;

sending an information signal to display a first portion of a second data within a second display area;

receiving a row scrolling instruction through the row scrolling control for scrolling the row;

selecting a set of display areas in the row for display based at least in part on the row scrolling instruction, the set of display areas including at least the second display area and a third display area containing a first portion of a third data;

receiving a cell scrolling instruction through the cell scrolling control for scrolling cells in a direction parallel to the row scrolling;

determining a cell scrolling display value based at least in part on the cell scrolling instruction;

selecting a second portion of the second data based at least in part on the cell scrolling display value;

selecting a second portion of the third data based at least in part on the cell scrolling display value;

sending an information signal to display the second portion of the second data within the second display area; and sending an information signal to display the second portion of the third data within the third display area.

* * * * *